July 30, 1968     L. A. FITZGERALD     3,394,787

SELF-ADJUSTING CLUTCH OR BRAKE

Filed May 31, 1967

INVENTOR
LLOYD A. FITZGERALD

BY Wheeler, Wheeler, House & Clemency
ATTORNEYS

United States Patent Office 3,394,787
Patented July 30, 1968

3,394,787
SELF-ADJUSTING CLUTCH OR BRAKE
Lloyd A. Fitzgerald, Wauwatosa, Wis., assignor to Stearns Electric Corporation, Milwaukee, Wis., a corporation of Wisconsin
Filed May 31, 1967, Ser. No. 642,388
6 Claims. (Cl. 192—84)

ABSTRACT OF THE DISCLOSURE

Clearance between relatively movable friction surfaces in a clutch or brake is self-adjusting by reason of a position fixing element which is normally fixed to the movable surface but which automatically releases and repositions itself to restore the surfaces to predetermined clearance when wear causes undue separation. This element is a clip which cramps itself on a post connected with the movable element. The clip has a leg movable between narrow limits and designed to relieve the cramping action to permit relative adjustment when such limits are exceeded in one direction. The invention is of particular value in magnetically operable clutches and brakes but is not limited thereto.

Background of invention

There are numerous patents which have for their objective self-adjustment of an armature to reduce excessive clearance between it and an electromagnet when excessive wear in a brake or clutch occasions such wear. Examples are Patents 2,705,056, 2,705,058, and 3,297,122. It will be understood that for the purposes of this disclosure there is no difference between a clutch and brake except in that the part engaged by the movable element is rotatable in the case of a clutch and fixed in the case of a brake. So far as the present invention is concerned, the operation is identical.

In all of the prior devices for the purpose which are known to me, there is a positioning device frictionally connected with the movable element, the degree of friction being such that it is greater than the retractive bias to which such element is subject but is less than the force exerted on such element when the clutch is engaged. Thus, there will be no slippage between the positioning device and the movable element as the element is retracted. However, if the movable element gets slightly too far away from the magnet complementary element, the closing force exerted thereon will first pull the element against the stop and then, if clearance remains to permit of further movement of the movable element, the resistance of the positioning device is overcome. The movable element then continues its stroke while the said device remains held by the stop. Operation is therefore dependent on a very narrow differential between the degree of friction at which slippage occurs and the degree at which there is no slip.

Summary of invention

The instant device differs from the prior art structures above described in that the nature of the connection between the positioning device and the movable element does not depend upon a predetermined value or a range of friction but depends on a relief of friction only when adjustment is needed. There is a substantially positive clamping effect which holds the movable element sufficiently securely so that it would be effective against relative movement in either direction were it not for the fact the clamping action is released when relative adjustment is required. Instead of overcoming frictional resistance, the device of the present invention eliminates or reduces the clamping action to a point such that the movable element readily moves with regard to its controlling device for a distance sufficient to effect readjustment. This is not only simple but it relieves the parts to a major degree of the frictional drag to which the parts are subject in the prior art devices.

Detailed description

Figure 1:
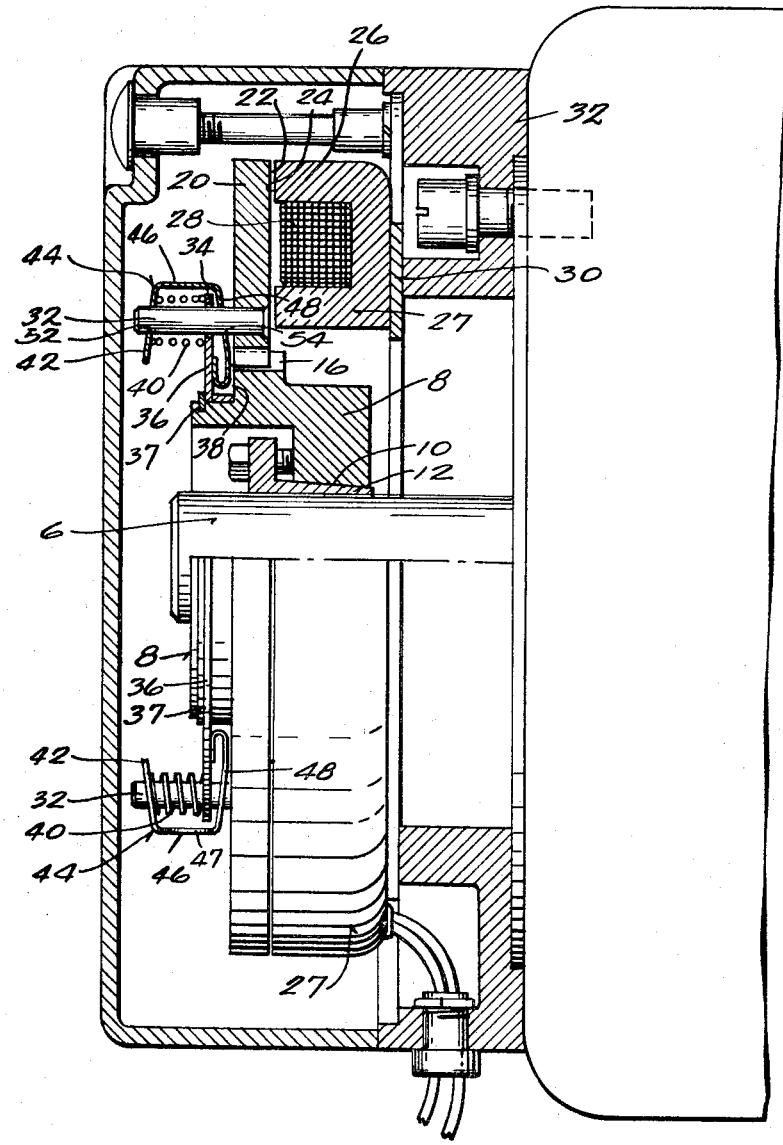
FIG. 1 is a view partially in side elevation and partially in axial section of a clutch embodying the invention.

Since the device is actually a clutch regardless of whether the magnet part is stationary or driven, it will be referred to as a clutch for the purposes of this disclosure. However, for convenience of illustration, the clutch is shown as used for braking purposes.

The part requiring to be braked is the shaft 6. In the instant embodiment, it carries a hub 8 having an inner periphery 10 which is complementary to a tapered sleeve 12. It has splines at 16 upon which the combination friction brake disk and armature 20 is mounted for axial movement while fixed to the shaft for rotation therewith.

The friction clutch face 22 of the armature disk 20 is movable to and from engagement with the complementary face 24 of a magnetizable friction clutch member 26 which, in the instant embodiment, is associated with a magnet frame 27 provided with a magnetic winding at 28. It has a mounting plate 30 by which it is secured to the stationary part 32.

When the winding 28 is energized, flux flowing through the clutch member 26 completes a circuit through the armature 20, drawing the armature sharply into contact with the surface 24 with resulting clutching (braking) action. Regardless of whether the device is used to connect rotating parts or to arrest rotation of shaft 6, as in the instant embodiment, the use results in wear of the faces 24 and 22. Even assuming that when the winding 28 is deenergized, the armature disk 20 is retracted to minimize such wear, it will be necessary, in successive uses, to draw the armature plate slightly farther as the result of an increase in the gap attributable to wear. Self-adjustment involves the maintenance of a substantially constant gap by automatically reestablishing from time to time the relationship between the magnet frame 26 and the armature 20.

For the dual purpose of retracting the armature and adjusting the gap, I provide studs 32 which project outwardly from the rear face of the armature 20, extending through openings 34 in a ring 36 fixed by collar 37 on the periphery of hub 8 in spaced relation to a shoulder 38 with which the hub is provided. Surrounding each of the studs 32 is a compression spring 40 for retracting the armature. Each such spring seats at its forward end upon the stop ring 36 and each seats at its rearward end against the apertured leg 42 of a spring 44 which is individual to the particular stud and which has its bight 46 spanning the stop 36. The clip has a leg 48 extending downwardly between the stop 36 and the stop shoulder 38. There is very little clearance, if any, between the spring leg 48, the stop shoulder 38 at one side of it and the stop ring 36 at its other side. To make the spring more flexible at the bight and thereby to avoid crystallizing the spring along the lines on which the legs join the bight, the width of the spring is reduced at the bight as indicated at 47.

Figure 2:
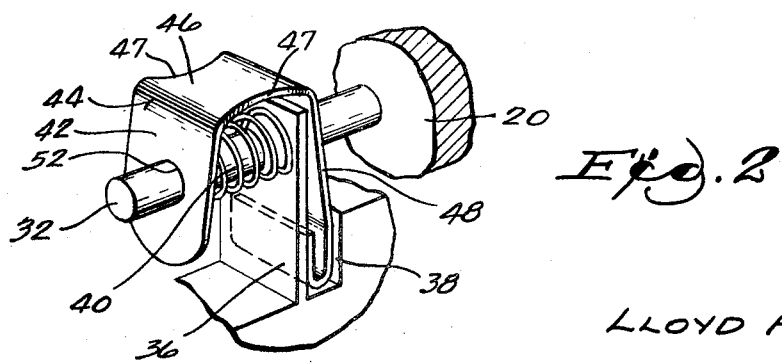
FIG. 2 is an enlarged fragmentary detail view in perspective showing the clip and associated stops used as positioning controlling means.

The respective apertures 52 and 54 of the clip legs 42 and 48 through which the respective stud 32 extends are fitted very closely to the stud. The bias of the compression spring 40 exerted rearwardly on the clip leg 42 tends to distort the clip to maintain its leg cramped upon the stud 32 with a degree of cramping action which makes the clip and stud relatively immovable. This cramping action results from the fact that the respective legs of the clip are bent to positions oblique with reference to the stud. The stud will pass freely through the openings 52 and 54 when the legs are at right angles to the stud, but when the legs are inclined as shown in FIG. 1 and FIG. 2, movement becomes virtually impossible without breakage.

It will be observed that when the armature is free of flux and is being urged rearwardly by the compression spring 40, the action of the spring on the clip leg 42 and the resulting action of the stop element 36 upon the clip leg 48 are both exerted in directions to hold these legs in their extreme obliquely cramped positions with regard to the stud.

However, assuming that wear has occurred, the forward movement of the armature clutch disk 20 in response to flux in the magnetized polar disk 26 will first thrust the clip leg 48 against the stop 38. If the armature surface 22 then engages the magnet clutch surface 24, the clip and the stud will remain fixed to each other. However, to the extent to which the clip leg 48 is displaced by the shoulder 38, prior to such engagement (this being due to an excessive spacing of the armature from the magnet) this deflection of the leg 48 of the clip will be in a direction such as to move the clip of the leg toward a position at right angles to the stud, thus eliminating the cramping action and leaving the stud and clip free for relative movement. This allows the armature to complete its stroke to effect full engagement of its surface 22 with the complementary clutch surface 24. The clip, meantime, is held in its new position and when the stud moves rearwardly the leg 48 cramps in that new position with reference to the stud and no further relative movement of any sort occurs until adjustment is needed.

I claim:

1. A self-adjusting clutch structure comprising the combination of clutch members one of which is movable relatively to and from engagement with the other, and at least one of which is rotatable, said members having engageable clutch surfaces subject to wear, opposing stops, a stud movable with one member, a clip including means for normally clamping it to the stud and further including a depending leg constituting clamp releasing means and disposed between said opposing stops, said leg encountering one of said stops in the movement of said one member toward the other member and being relatively moved thereby in a direction to release said clamping means, whereby to permit independent movement of said stud and said one member respecting the clip and in the direction of said other member.

2. A self-adjusting clutch structure according to claim 1 in which one said member includes an armature and the other member is provided with an electromagnet which draws said one member toward the other, the said stud being mounted on said one member, the clip comprising a spring strip having normally divergent legs connected by a bight at one side of the stud and having bias to spread said legs, the legs having apertures through which the stud extends and being cramped upon the stud to constitute said clamping means except when forced toward parallelism in opposition to said bias, one of said clip legs constituting the depending leg aforesaid and encounter thereof with said one stop being adapted to flex the depending leg in opposition to said clip bias and thereby to release clamping engagement of the clip with the stud.

3. A self-adjusting clutch comprising members having clutch faces and means mounting said members for relative axial movement, at least one of which members constitutes a rotor, electromagnetic means for drawing said one member toward the other member to engage their clutch faces, at least one stud projecting axially from the movable member, an apertured stop through which said stud extends, a clip spanning the stop and having divergent legs provided with apertures through which said stud extends, the divergence of said legs causing them to be cramped upon the stud, and means for compressing the legs toward each other for relieving cramping action thereof upon the stud when said one member moves toward the other member.

4. A self-adjusting clutch according to claim 3 in which a compression spring encircles the stud between the stop and the clip leg most remote from said one member.

5. A self-adjusting clutch according to claim 4 in which spaced means at opposite sides of the other leg of said clip engage said other leg in one direction or the other depending on the direction of movement of said stud, said spaced means and other leg constituting the said means for relieving the stud of the cramping action of said clip when said one member moves toward the other member.

6. A self-adjusting clutch according to claim 3 in which a hub has splined engagement with said one member and is provided with a radial flange constituting said apertured stop, a compression spring seated against said flange and against the leg of said clip which is remote from said one member, said hub having a shoulder spaced from the stop and providing therewith a channel into which the oher leg of said clip projects, said other leg having limited clearance between the stop and the shoulder, the shoulder constituting the said means for compressing the divergent legs toward each other and thereby relieving the stud from the cramping action of the clip when said other leg engages the shoulder.

References Cited
UNITED STATES PATENTS

| | | |
|---|---|---|
| 2,536,269 | 1/1951 | Driscoll. |
| 2,607,442 | 8/1952 | Lucker et al. |
| 2,808,917 | 10/1957 | Harter. |
| 2,981,379 | 4/1961 | Burrell. |
| 3,091,310 | 5/1963 | Smith et al. |
| 3,221,854 | 12/1965 | Jaeschke et al. |
| 3,286,803 | 11/1966 | Zeidler. |
| 3,297,122 | 1/1967 | Simonson. |
| 3,337,013 | 8/1967 | Wrensch. |

MARTIN P. SCHWADRON, *Primary Examiner.*

C. LEEDOM, *Assistant Examiner.*